(12) United States Patent
Park et al.

(10) Patent No.: US 8,947,993 B2
(45) Date of Patent: Feb. 3, 2015

(54) METHODS OF TRANSMITTING USING FILTERING IN THE TIME DOMAIN AND RELATED DEVICES

(75) Inventors: Chester Park, San Jose, CA (US); Dennis Hui, Sunnyvale, CA (US)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 163 days.

(21) Appl. No.: 13/556,818

(22) Filed: Jul. 24, 2012

(65) Prior Publication Data

US 2014/0029511 A1 Jan. 30, 2014

(51) Int. Cl.
*H04L 27/26* (2006.01)

(52) U.S. Cl.
CPC .................................. *H04L 27/2627* (2013.01)
USPC ........................................................ 370/203

(58) Field of Classification Search
CPC . H04L 27/26; H04L 27/2601; H04L 27/2626; H04L 27/2647; H04L 27/2655; H04L 27/2662; H04L 27/2666; H04L 27/2668; H04L 27/2673
USPC ......... 370/201, 203, 342, 503, 335, 464–468; 375/295, 296, 354, 355, 346, 348
See application file for complete search history.

(56) References Cited

U.S. PATENT DOCUMENTS

| 6,208,671 | B1* | 3/2001 | Paulos et al. | 370/545 |
|---|---|---|---|---|
| 6,973,144 | B1* | 12/2005 | Zhu et al. | 375/350 |
| 8,711,903 | B2* | 4/2014 | Rheinfelder et al. | 375/219 |
| 2002/0012436 | A1* | 1/2002 | Woog | 381/92 |
| 2003/0076899 | A1* | 4/2003 | Kumar et al. | 375/316 |
| 2004/0184573 | A1* | 9/2004 | Andersen et al. | 375/372 |
| 2004/0196915 | A1* | 10/2004 | Gupta | 375/260 |
| 2006/0087961 | A1* | 4/2006 | Chang et al. | 370/203 |
| 2006/0187775 | A1* | 8/2006 | Yin et al. | 369/44.28 |
| 2007/0041438 | A1* | 2/2007 | Mogi et al. | 375/232 |
| 2008/0151984 | A1* | 6/2008 | Schmidt et al. | 375/230 |
| 2008/0315940 | A1* | 12/2008 | Yamamoto | 327/355 |
| 2009/0045992 | A1* | 2/2009 | Tracht et al. | 341/61 |
| 2009/0143884 | A1* | 6/2009 | Chieng et al. | 700/94 |
| 2010/0251877 | A1* | 10/2010 | Jochelson et al. | 84/609 |
| 2013/0044028 | A1* | 2/2013 | Lea et al. | 342/359 |

OTHER PUBLICATIONS

Meyr, H. et al., *Digital Communication Receivers, Synchronization, Channel Estimation, and Signal Processing*, John Wiley & Sons, New York, 1998, pp. 505-523.
Vaidyanathan, P.P., *Multirate Systems and Filter Banks*, PTR Prentice Hall, New Jersey, 1993, pp. 127-130.
International Search Report, PCT/IB2013/056040, Nov. 18, 2013.
Written Opinion of the International Searching Authority, PCT/IB2013/056040, Nov. 18, 2013.

(Continued)

*Primary Examiner* — Kerri Rose
(74) *Attorney, Agent, or Firm* — Myers Bigel Sibley & Sajovec, P.A.

(57) ABSTRACT

Methods may be provided to transmit data from a wireless terminal operating in a radio access network. For example, sampling rate conversion may be performed on a serial stream of modulation symbols to generate sampling rate converted symbols, and the sampling rate converted symbols may be transmitted over a wireless channel to a node of the radio access network. Related terminals are also discussed.

26 Claims, 9 Drawing Sheets

FFT-IFFT Based DFTS-OFDM Transmitter

(56) References Cited

OTHER PUBLICATIONS

"Single Carrier Uplink Options for E-UTRA: IFDMA/DFT-SODFM Discussion and Initial Performance Results", 3GPP Draft; R1-050971_LTE_EUTRA UL Discussion 2, 3$^{rd}$ Generation Partnership Project (3GPP), Mobile Competence Centre; 650, Route des Lucioles; F-06921 Sophia-Antipolis Cedex; France, no. London; Aug. 29-Sep. 2, 2005; Sep. 5, 2005, XP050596000, 30 pages.

Meng Ma et al.: "An interference self-cancellation technique for SC-FDMA systems", IEEE Communications Letters, IEEE Service Center, Piscataway, NJ, US, vol. 14, No. 6, Jun. 1, 2010, pp. 512-514, XP011310516, ISSN: 1089-7798.

Hyung G. Myung et al.: "Single carrier FDMA for uplink wireless transmission" IEEE Vehicular Technology Magazine, IEEE, US, vol. 1, No. 3, Sep. 1, 2006, pp. 30-38, XP011165321, ISSN: 1556-6072.

* cited by examiner

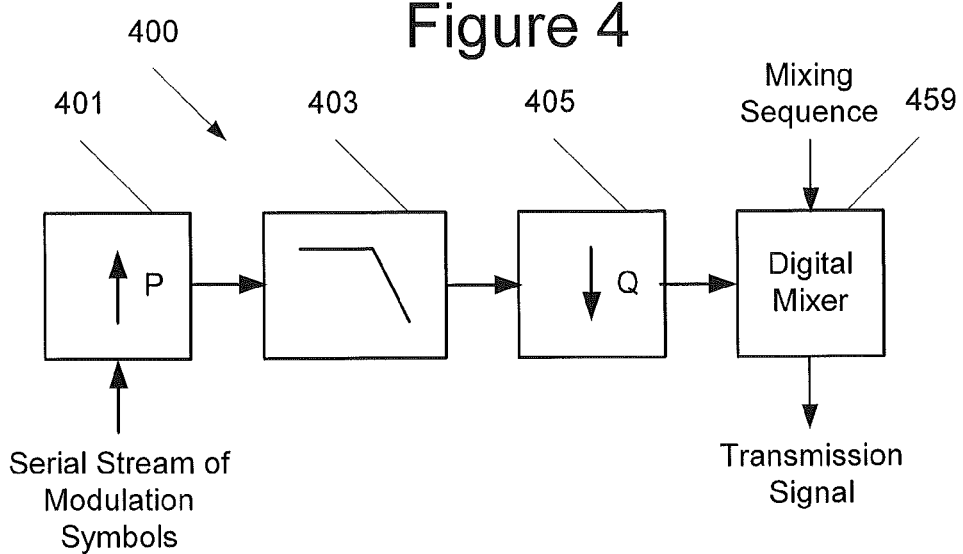
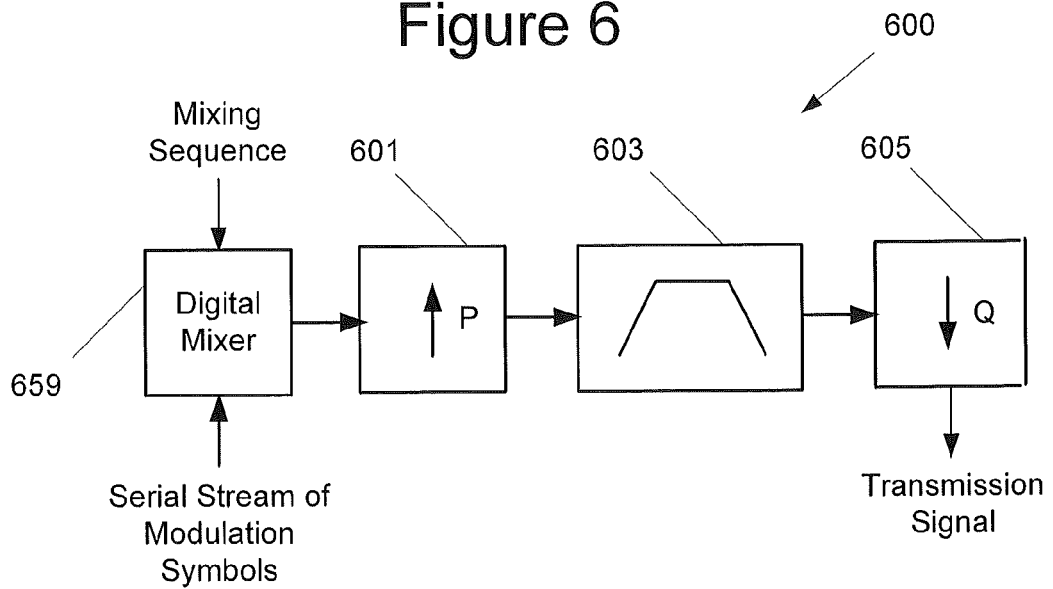

Vector Combining Embodiments of Reduced Complexity DFTS-OFDM Transmitter With Vector Multiplication and Post-Frequency Shifting.

Vector Combining Embodiments of Reduced Complexity DFTS-OFDM Transmitter With Vector Multiplication and Pre-Frequency Shifting.

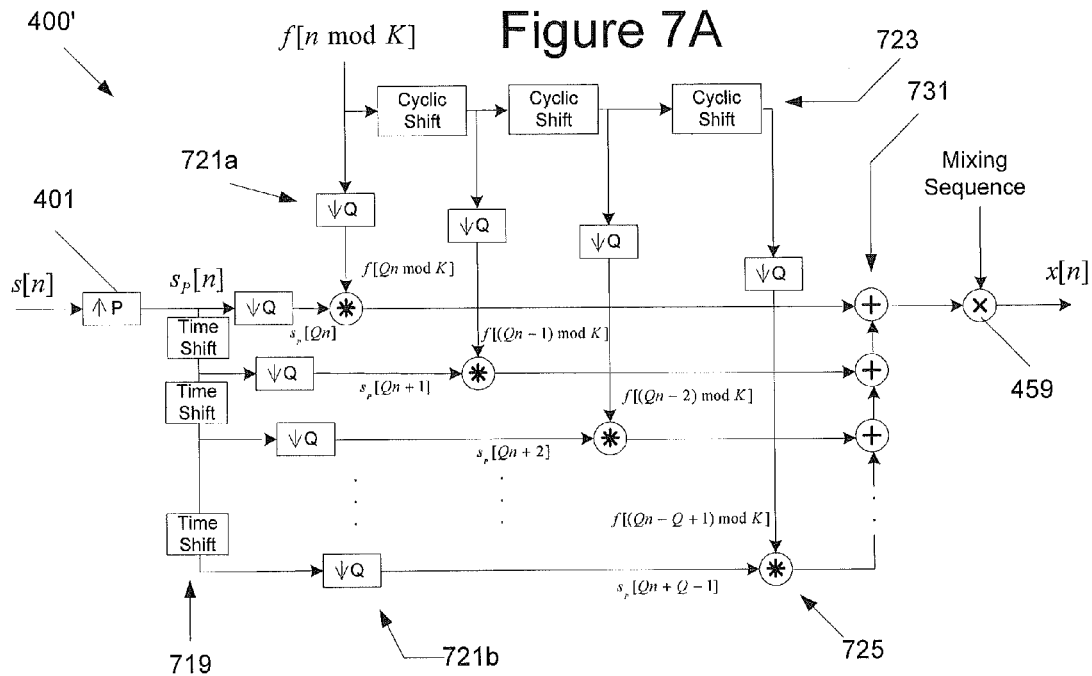
Polyphase Embodiments of Reduced Complexity DFTS-OFDM Transmitter With Circular Convolution and Pre-Frequency Shifting.
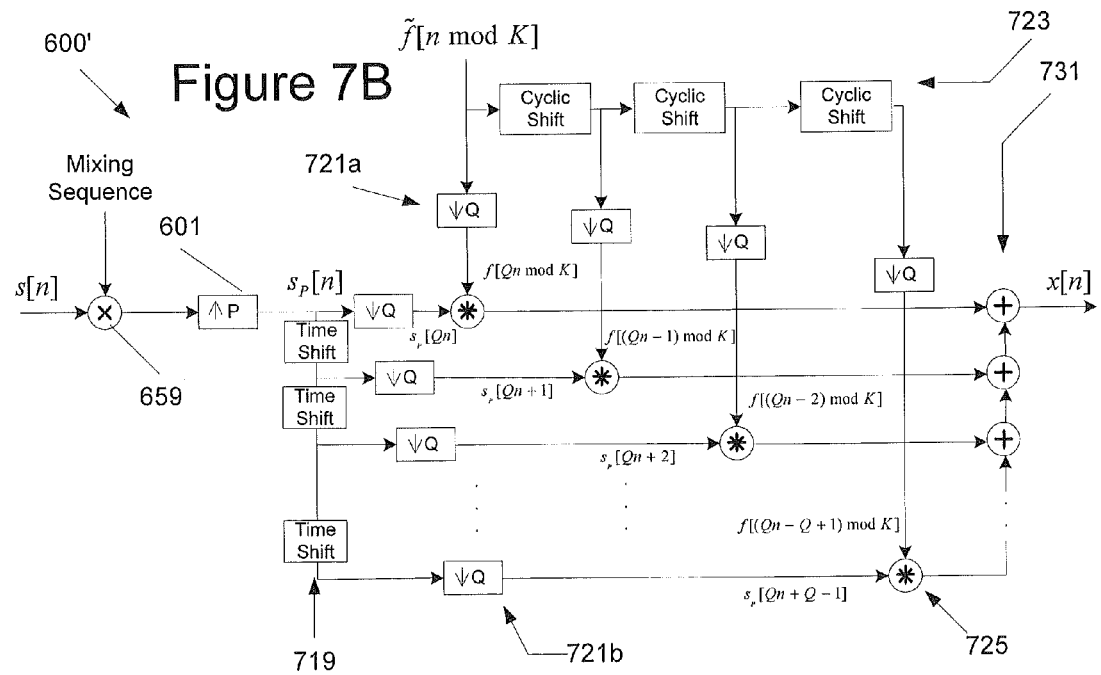
Polyphase Embodiments of Reduced Complexity DFTS-OFDM Transmitter With Circular Convolution and Post-Frequency Shifting.

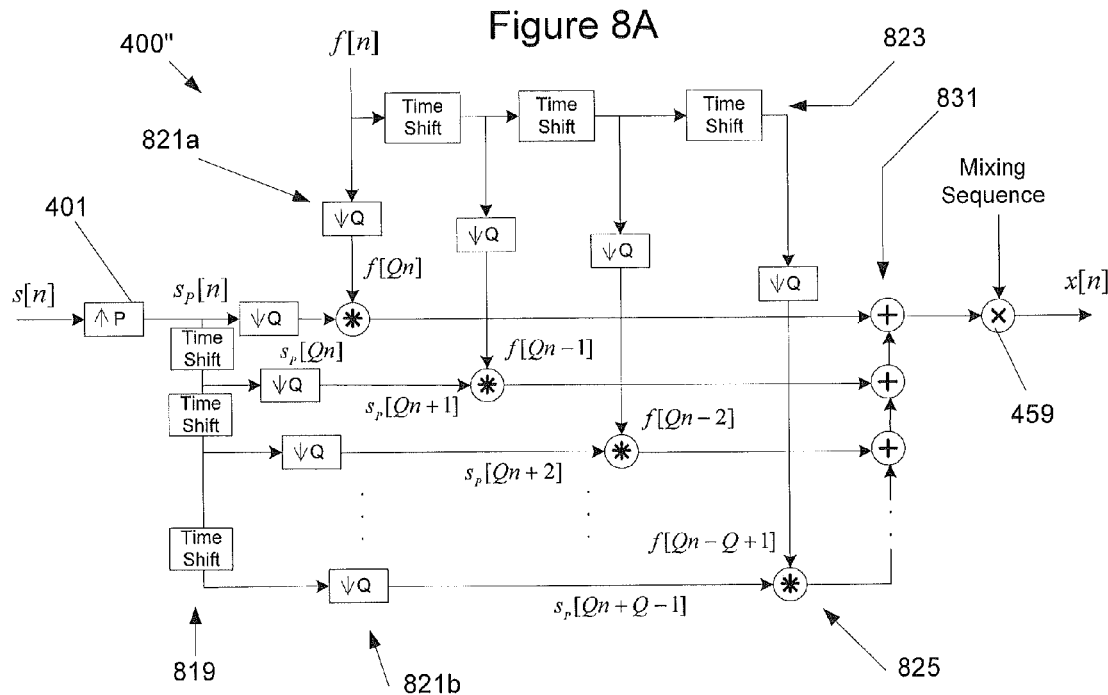
Polyphase Embodiments of Reduced Complexity DFTS-OFDM Transmitter With Linear Convolution and Post-Frequency Shifting.
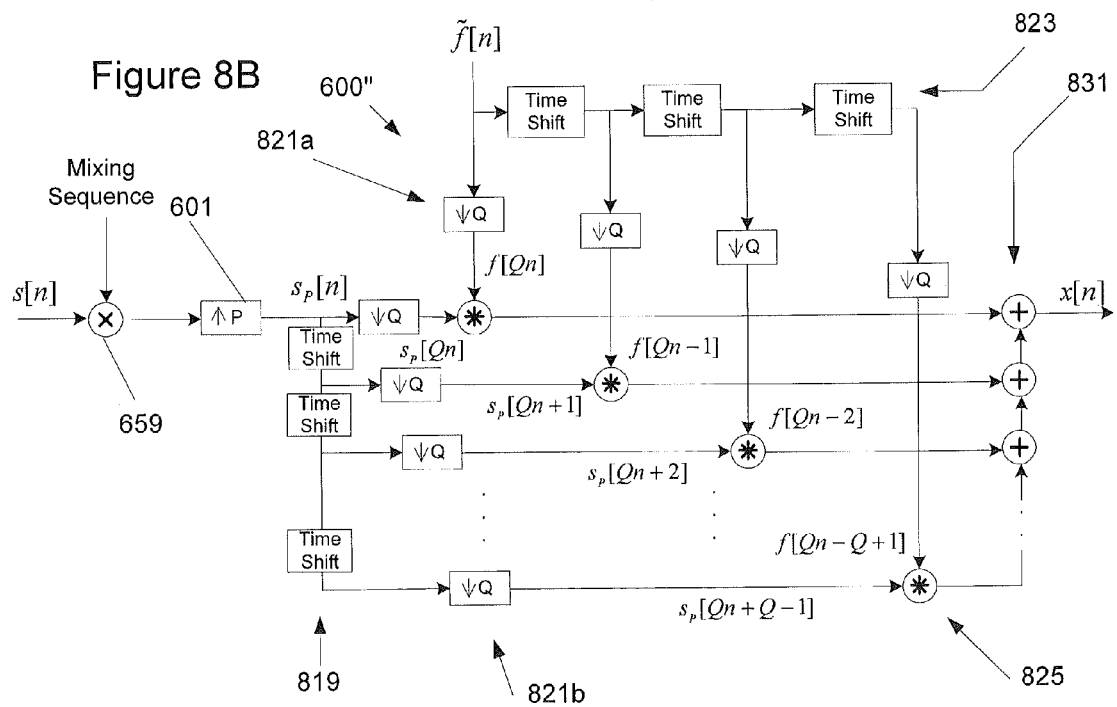
Polyphase Embodiments of Reduced Complexity DFTS-OFDM Transmitter With Linear Convolution and Pre-Frequency Shifting.

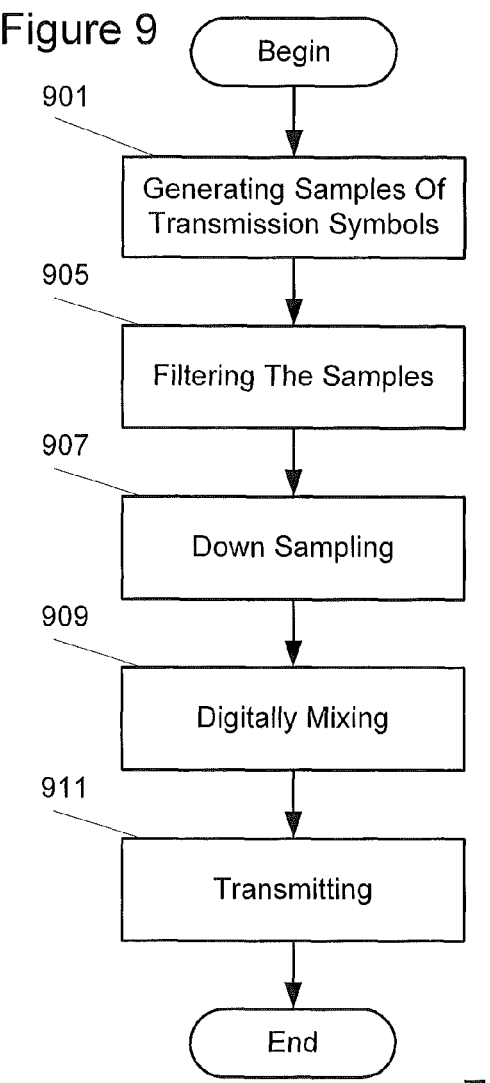
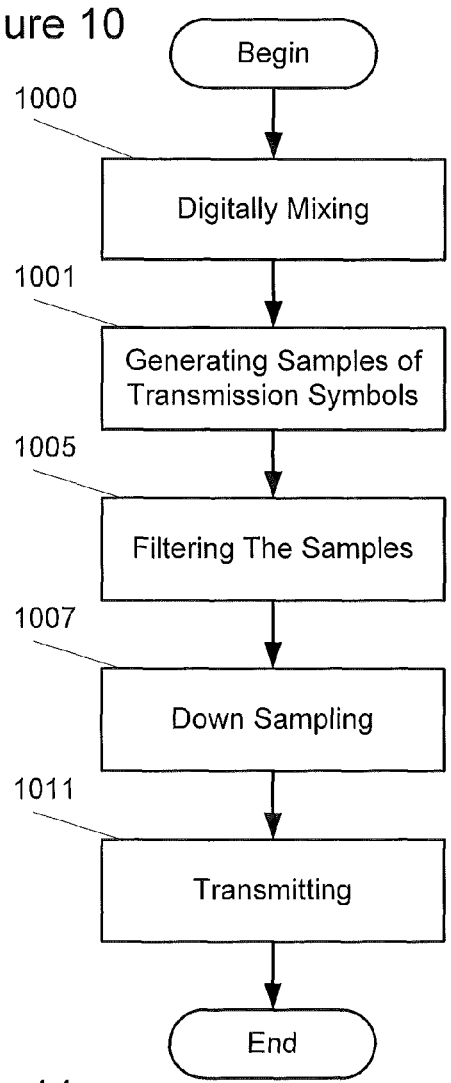
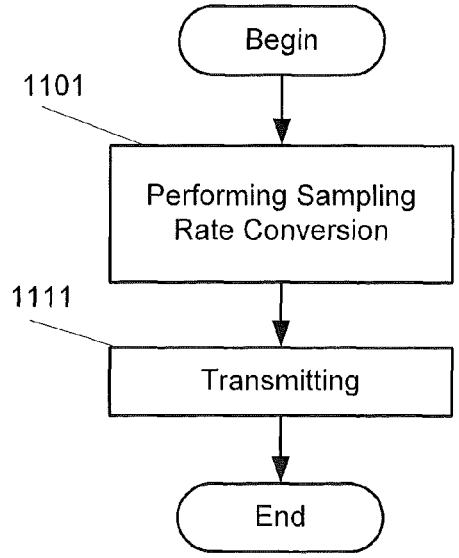

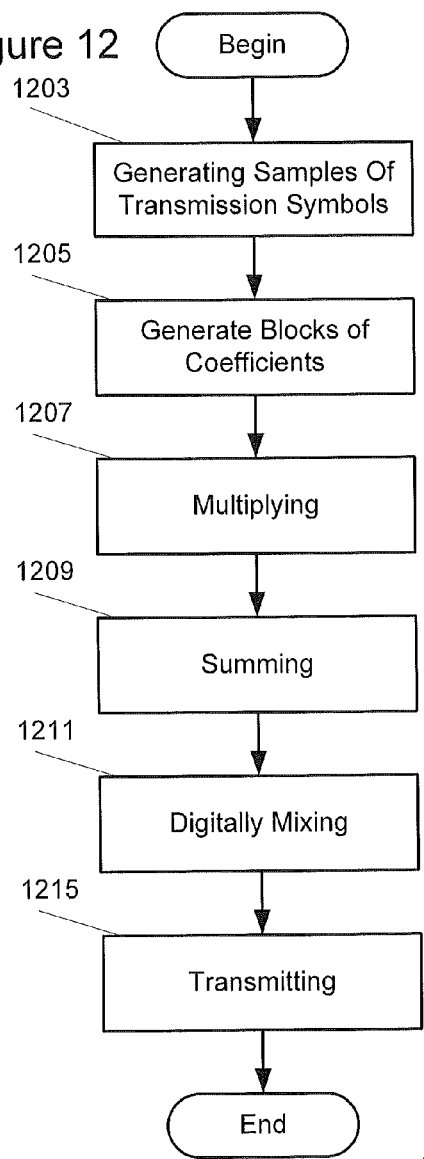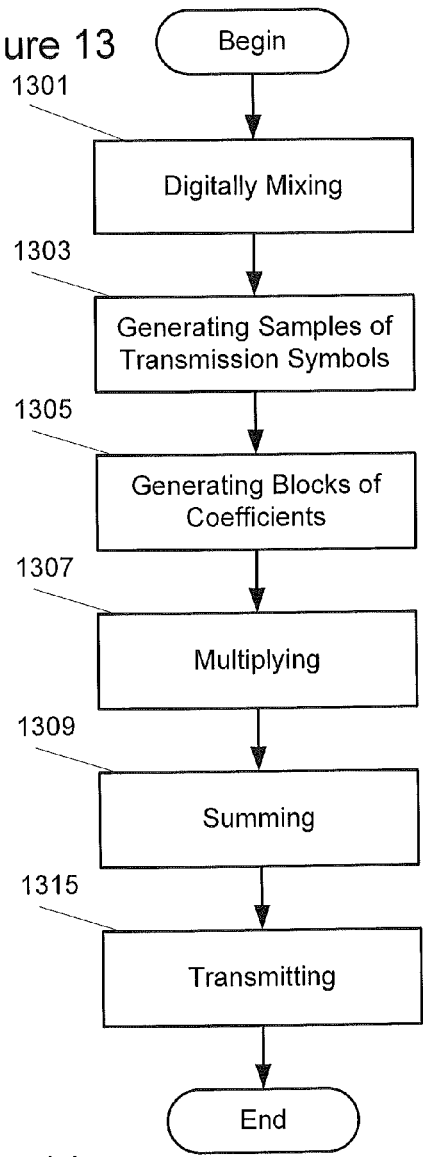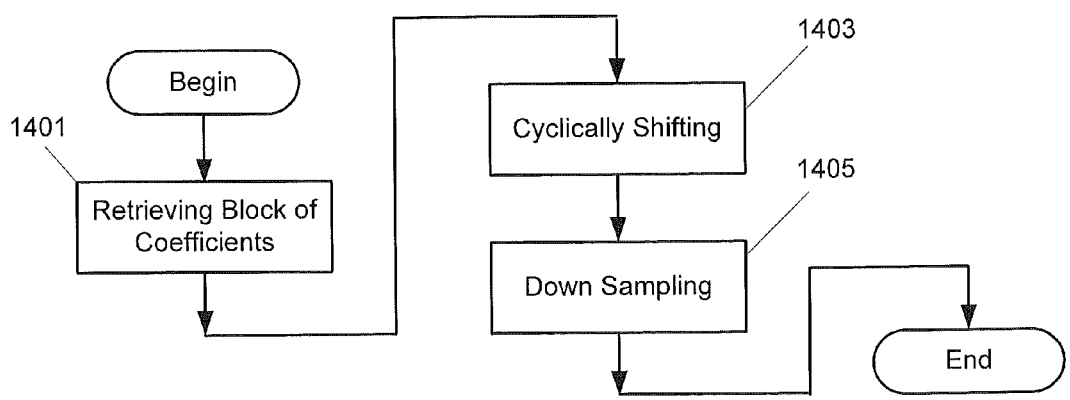

METHODS OF TRANSMITTING USING FILTERING IN THE TIME DOMAIN AND RELATED DEVICES

TECHNICAL FIELD

The present disclosure is directed to wireless communications and, more particularly, to multipoint wireless communications and related network nodes.

BACKGROUND

In a typical cellular radio system, wireless terminals (also referred to as user equipment unit nodes, UEs, and/or mobile stations) communicate via a radio access network (RAN) with one or more core networks. The RAN covers a geographical area which is divided into cell areas, with each cell area being served by a radio base station (also referred to as a RAN node, a "NodeB", and/or enhanced NodeB "eNodeB"). A cell area is a geographical area where radio coverage is provided by the base station equipment at a base station site. The base stations communicate through radio communication channels with UEs within range of the base stations.

Some cellular radio communications systems (including 3GPP LTE) are considering reduced/low complexity air interfaces to support, for example, so-called machine-type communications, also referred to as machine-to-machine or M2M communications. Demand for low/reduced-complexity air interfaces may be driven by increasing numbers of low/reduced data rate wireless data connections between/among numerous self-directed machines and/or between the self-directed machines and the network.

Third Generation Partnership Project (3GPP) Long-Term Evolution (LTE) uplinks (ULs) may be characterized by Discrete Fourier Transform Spread Orthogonal Frequency Domain Multiplexing (DFTS-OFDM) transmission, which may benefit from relatively low/reduced Peak-to-Average Power Ratio (PAPR) and thus more efficient power amplification. More particularly, a DFTS-OFDM transmitter may use both Fast Fourier Transform (FFT) and Inverse Fast Fourier Transform (IFFT) operations to confine transmission to an assigned wireless terminal (user) bandwidth. Despite advances in Complementary Metal Oxide Semiconductor (CMOS) technologies, implementation of FFT and/or IFFT may be challenging, especially, when targeted for low/reduced complexity (e.g., low/reduced-power and/or low/reduced-cost) devices.

Accordingly, there may continue to exist a need for transmitter structures, for example, that are adapted to support relatively low power and/or low data rate wireless communications in radio access networks.

SUMMARY

It is therefore an object to address at least some of the above mentioned disadvantages and/or to improve performance in a wireless communication system.

According to some embodiments of the present invention, a method may be provided to transmit data from a wireless terminal operating in a radio access network. The method may include performing sampling rate conversion on a serial stream of modulation symbols to generate sampling rate converted symbols, and transmitting the sampling rate converted symbols over a wireless channel to a node of the radio access network.

Performing sampling rate conversion may include determining corresponding rate conversion based on cell bandwidth and based on user bandwidth assigned to the wireless terminal.

Before transmitting the sampling rate converted symbols and after performing sampling rate conversion, the sampling rate converted symbols may be digitally mixed with a mixing sequence. Digitally mixing the sample rate converted symbols may include determining the mixing sequence based on a frequency location of user bandwidth assigned to the wireless terminal. Performing sampling rate conversion may include using a polyphase structure of a corresponding fractional decimation/interpolation and/or using a Farrow structure of a corresponding polynomial interpolation.

Before performing sampling rate conversion, the serial stream of modulation symbols may be digitally mixed with a mixing sequence.

Performing sampling rate conversion may include generating samples of transmission symbols from a serial stream of modulation symbols, filtering the samples of the transmission symbols in a time domain to generate filtered samples of the transmission symbols, and down sampling the filtered samples of the transmission symbols to generate the sampling rate converted symbols.

Before transmitting the sampling rate converted symbols and after down sampling the filtered samples of the transmission symbols, the down sampled versions of the transmission symbols may be digitally mixed with a mixing sequence. Filtering the samples of the transmission symbols may include low pass filtering the samples of the transmission symbols. Digitally mixing the down sampled versions of the transmission symbol with the mixing sequence may include moving a spectrum of the down sampled versions of the transmission symbols to a bandwidth assigned to the wireless terminal.

Before generating the samples of the transmission symbols, the serial stream of modulation symbols may be digitally mixed with a mixing sequence. Filtering the samples of the transmission symbols may include band pass filtering the samples of the transmission symbols.

Generating the samples of transmission symbols may include up sampling the serial stream of modulation symbols.

Filtering may include filtering out replica symbols from the samples of transmission symbols.

Filtering the samples of the transmission symbols in the time domain may include filtering the samples of the transmission symbols using circular convolution.

Filtering the samples of the transmission symbols in the time domain may include filtering the samples of the transmission symbols using linear convolution. Filtering the samples of the transmission symbols using linear convolution may include filtering the samples of the transmission symbols using a partial-response low-pass filter.

Performing sampling rate conversion may include generating samples of transmission symbols from a serial stream of modulation symbols, generating multiple blocks of coefficients using pre-calculated information, multiplying each block of coefficients by a respective one of the samples of transmission symbols to provide respective coefficient block products, and summing the coefficient block products to generate the sampling rate converted symbols.

Generating multiple blocks of coefficients using pre-calculated information may include retrieving a block of coefficients from memory, cyclically shifting at least portions of the block of coefficients to generate a plurality of cyclically shifted versions of the block of coefficients, and down sampling each of the cyclically shifted versions of the block of coefficients to provide multiple blocks of down sampled cyclically shifted versions of the block of coefficients.

Before transmitting the sampling rate converted symbols and after summing the coefficient block products, the sampling rate converted symbols may be digitally mixed with a mixing sequence.

Before generating the samples of the transmission symbols, the serial stream of modulation symbols may be digitally mixed with a mixing sequence.

According to still other embodiments of the present invention, a wireless terminal may be configured for communication in a radio access network. The wireless terminal may include a processor, and a transmitter coupled to the processor. The processor and/or the transmitter may be configured to perform sampling rate conversion on a serial stream of modulation symbols to generate sampling rate converted symbols, and to transmit the sampling rate converted symbols over a wireless channel to a node of the radio access network.

According to still other embodiments of the present invention, a wireless terminal may be configured for communication in a radio access network. The wireless terminal may include a processor, and a transmitter coupled to the processor. The processor and/or the transmitter may be configured generate samples of transmission symbols from a serial stream of modulation symbols, to generate multiple blocks of coefficients using pre-calculated information, to multiply each block of coefficients by a respective one of the samples of transmission symbols to provide respective coefficient block products, to sum the coefficient block products, and to transmit the summed coefficient block products over a wireless channel to a node of the radio access network.

BRIEF DESCRIPTION OF THE DRAWINGS

The accompanying drawings, which are included to provide a further understanding of the disclosure and are incorporated in and constitute a part of this application, illustrate certain non-limiting embodiment(s) of the invention. In the drawings:

FIG. 4 is a block diagram illustrating transmitter structures of FIG. 2 including sampling rate conversion followed by digital mixing;

FIG. 6 is a block diagram illustrating transmitter structures of FIG. 2 including digital mixing followed by sampling rate conversion;

FIGS. 7A and 7B are block diagrams illustrating transmitter structures of FIG. 2 including polyphase embodiments with circular convolution;

FIGS. 8A and 8B are block diagrams illustrating transmitter structures of FIG. 2 including polyphase embodiments with linear convolution; and FIGS. 9-14 are flow charts illustrating transmitter operations according to some embodiments of the present invention.

DETAILED DESCRIPTION

Figure 1:
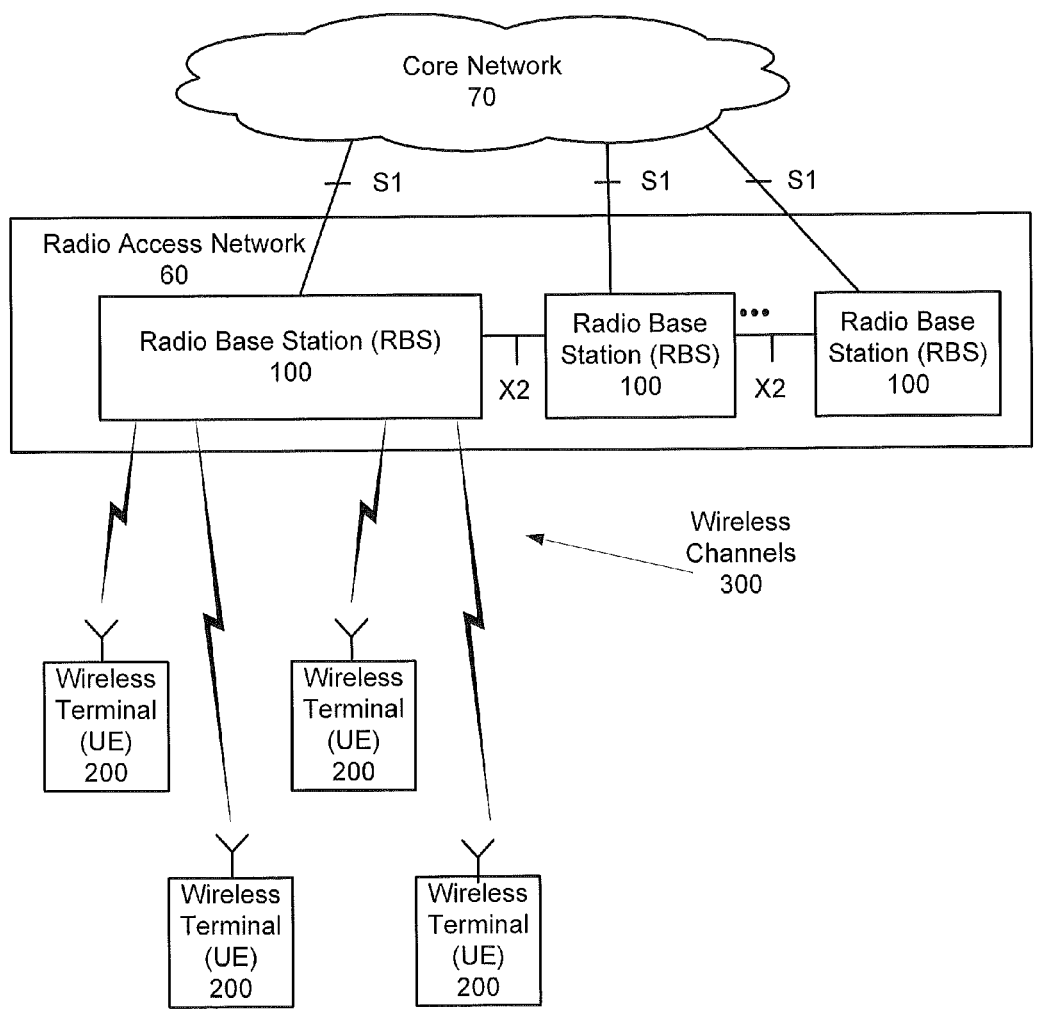
FIG. 1 is a block diagram of a communication system that is configured according to some embodiments.

The invention will now be described more fully hereinafter with reference to the accompanying drawings, in which examples of embodiments of the invention are shown. This invention may, however, be embodied in many different forms and should not be construed as limited to the embodiments set forth herein. Rather, these embodiments are provided so that this disclosure will be thorough and complete, and will fully convey the scope of the present invention to those skilled in the art. It should also be noted that these embodiments are not mutually exclusive. Components from one embodiment may be tacitly assumed to be present/used in another embodiment.

For purposes of illustration and explanation only, these and other embodiments of the present invention are described herein in the context of operating in a RAN that communicates over radio communication channels with wireless terminals (also referred to as UEs). It will be understood, however, that the present invention is not limited to such embodiments and may be embodied generally in any type of communication network. As used herein, a wireless terminal (also referred to as a UE) can include any device that receives data from a communication network, and may include, but is not limited to, a mobile telephone ("cellular" telephone), laptop/portable computer, pocket computer, hand-held computer, and/or desktop computer.

In some embodiments of a RAN, several base stations can be connected (e.g., by landlines or radio channels) to a radio network controller (RNC). The radio network controller, also sometimes termed a base station controller (BSC), supervises and coordinates various activities of the plural base stations connected thereto. The radio network controller is typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) technology. UTRAN, short for UMTS Terrestrial Radio Access Network, is a collective term for the Node B's and Radio Network Controllers which make up the UMTS radio access network. Thus, UTRAN is essentially a radio access network using wideband code division multiple access for UEs.

The Third Generation Partnership Project (3GPP) has undertaken to further evolve the UTRAN and GSM based radio access network technologies. In this regard, specifications for the Evolved Universal Terrestrial Radio Access Network (E-UTRAN) are ongoing within 3GPP. The Evolved Universal Terrestrial Radio Access Network (E-UTRAN) comprises the Long Term Evolution (LTE) and System Architecture Evolution (SAE).

Note that although terminology from 3GPP ($3^{rd}$ Generation Partnership Project) LTE (Long Term Evolution) is used in this disclosure to exemplify embodiments of the invention, this should not be seen as limiting the scope of the invention to only these systems. Other wireless systems, including WCDMA (Wideband Code Division Multiple Access), WiMax (Worldwide Interoperability for Microwave Access), UMB (Ultra Mobile Broadband), HSDPA (High-Speed Downlink Packet Access), GSM (Global System for Mobile Communications), etc., may also benefit from exploiting embodiments of the present invention disclosed herein.

Also note that terminology such as base station (also referred to as eNodeB or Evolved Node B) and wireless terminal (also referred to as UE or User Equipment) should be considering non-limiting and does not imply a certain hierarchical relation between the two. In general a base station (e.g., an "eNodeB") and a wireless terminal (e.g., a "UE") may be considered as examples of respective different communications devices that communicate with each other over a wireless radio channel. While embodiments discussed herein may focus on wireless transmissions in a downlink from an eNodeB to a UE, embodiments of the invention may also be applied, for example, in the uplink.

FIG. 1 is a block diagram of a communication system that is configured to operate according to some embodiments of the present invention. An example RAN 60 is shown that may be a Long Term Evolution (LTE) RAN. Radio base stations (e.g., eNodeBs) 100 may be connected directly to one or more core networks 70, and/or radio base stations 100 may be coupled to core networks 70 through one or more radio network controllers (RNC). In some embodiments, functionality of a radio network controller(s) may be performed by radio base stations 100. Radio base stations 100 communicate over wireless channels 300 with wireless terminals (also referred to as user equipment nodes or UEs) 200 that are within their respective communication service cells (also referred to as coverage areas). The radio base stations 100 can communicate with one another through an X2 interface and with the core network(s) 70 through S1 interfaces, as is well known to one who is skilled in the art.

Figure 2:
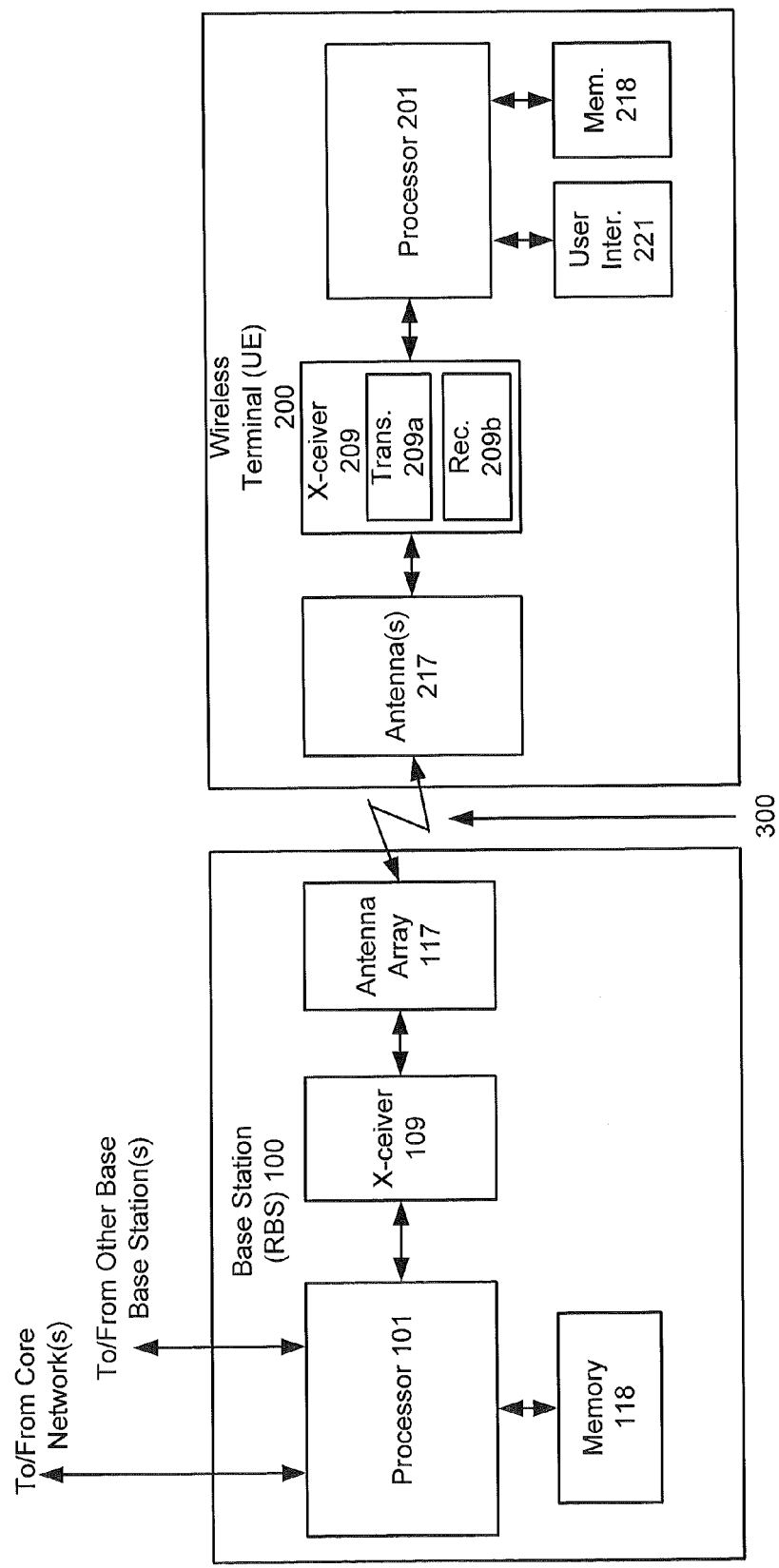
FIG. 2 is a block diagram illustrating a base station and a wireless terminal according to some embodiments of FIG. 1.

FIG. 2 is a block diagram of a base station 100 and a wireless terminal 200 of FIG. 1 in communication over wireless channel 300 according to some embodiments of the present invention. As shown, base station 100 may include transceiver 109 coupled between processor 101 and antenna array 117 (including multiple antennas), and memory 118 coupled to processor 101. Moreover, wireless terminal 200 may include transceiver 209 coupled between antenna array 217 and processor 201, and user interface 221 and memory 218 may be coupled to processor 201. Accordingly, base station processor 101 may transmit communications through transceiver 109 and antenna array 117 for reception at wireless terminal processor 201 through antenna array 217 and transceiver 209. In the other direction, wireless terminal processor 201 may transmit communications through transceiver 209 and antenna array 217 for reception at base station processor 101 through antenna array 117 and transceiver 109. To support up to 4-branch MIMO (allowing parallel transmission of 4 layers/streams of data using a same Time Frequency Resource Element or TFRE), each of antenna arrays 117 and 217 may include four (or more) antenna elements. Wireless terminal 200 of FIG. 2, for example, may be a cellular radiotelephone, a smart phone, a laptop/netbook/tablet/handheld computer, or any other device providing wireless communications. User interface 211, for example, may include a visual display such as an liquid crystal display, a touch sensitive visual display, a keypad, a speaker, a microphone, etc.

As further shown in FIG. 2, wireless terminal transceiver 209 may include a transmitter 209a configured to transmit communications through antenna(s) 217 over channel 300 to base station 100 and a receiver 209b configured to receive communications from base station 100 over channel 300 through antenna(s) 271. Structures and/or operations of transmitter 209a will be discussed in greater detail below with respect to FIGS. 3-11. Additionally, certain implementations of disclosed solutions may be especially suitable for use with sensors, meters, identification tags, and/or other wireless devices with relatively low/reduced rate data transmission needs. As a result, wireless terminal 200 may also represent a sensor, meter, identification tag, or any other suitable device capable of some form of wireless communication, including devices that may not provide a full range of conventional communication functionality. Thus, particular embodiment of wireless terminal 200 may not include user interface 211.

Figure 3:
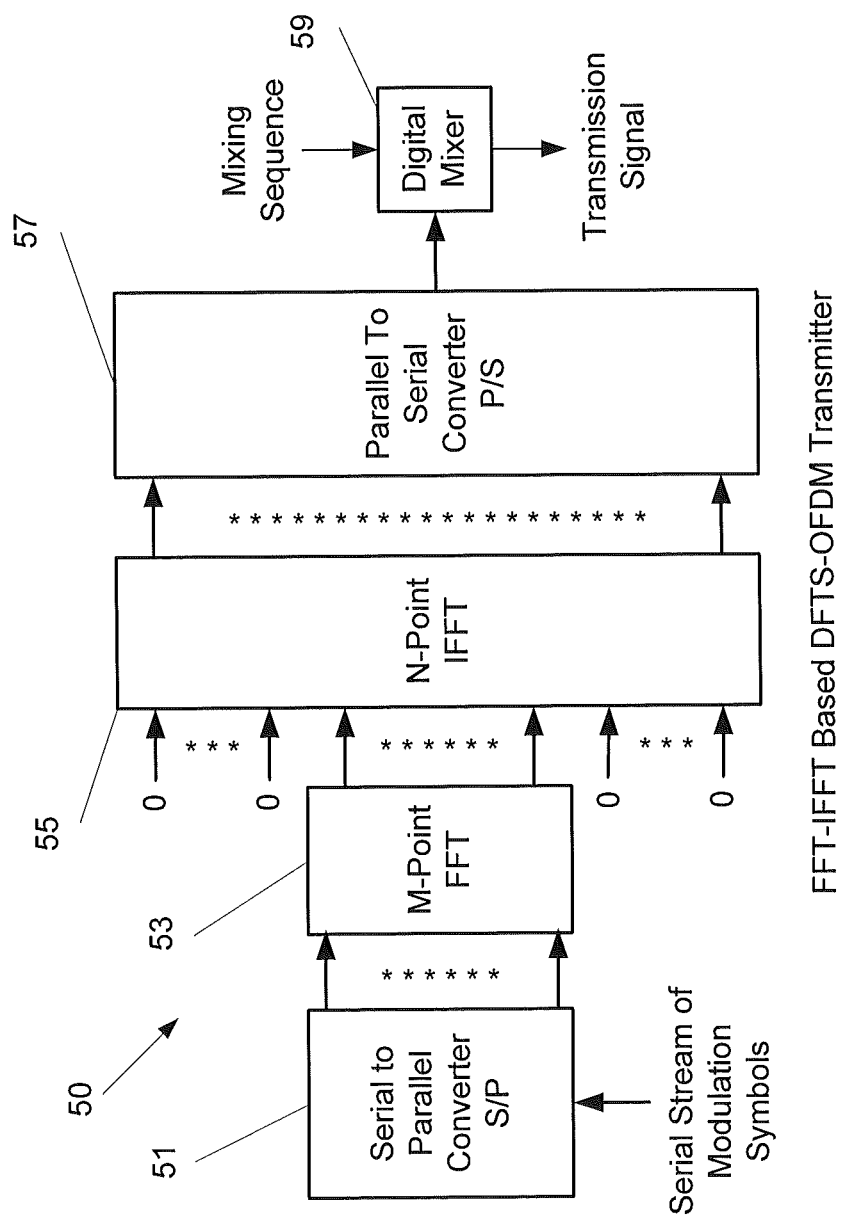
FIG. 3 is a block diagram illustrating transmitter structures of FIG. 2 providing fast Fourier and inverse fast Fourier transforms.

As shown in FIG. 3, DFTS-OFDM transmitter 50 may include a serial to parallel converter (S/P) 51, M-Point fast Fourier transform FFT block 53, N-Point IFFT block 55, parallel to serial converter (P/S) 57, and digital mixer 59. Serial to Parallel Converter 51 may convert a serial stream of modulation symbols (e.g., QAM symbols) into M parallel streams of modulation symbols, and M-point fast Fourier transform FFT 55 may perform a fast Fourier transform to spread M modulation symbols of the M parallel streams across the M subcarriers assigned to transmitter 50. After mapping outputs of M-point FFT block 53 to the M assigned subcarriers and padding zeros to the (N−M) unused subcarriers, transmitter 50 may use N-point IFFT block 55 to generate the transmitted signal in time domain using an inverse fast Fourier transform. Note that a DFTS-OFDM transmitter may use a same structure as an OFDMA transmitter with the addition of FFT spreading. Due to frequency-domain operation (e.g., resource allocation between FFT and IFFT blocks), DFTS-OFDM transmitter 50 may effectively confine a spectrum of a transmit signal to the assigned user bandwidth and suppress/reduce adjacent-channel interference. Note that the resource allocation (i.e., subcarrier mapping and zero padding) may determine a spectrum mask of a transmit signal in DFTS-OFDM transmitter 50.

The DFTS-OFDM transmitter 50 of FIG. 3 may thus use both FFT and IFFT operations/blocks. Although recent advances in CMOS technologies may ease implementation of FFT and/or IFFT operations/blocks, DFTS-OFDM transmitter 50 of FIG. 3 may still be challenging to implement for low/reduced cost and/or low/reduced power devices in a system supporting a relatively large total number of subcarriers (e.g., 2048 subcarriers for LTE).

Some embodiments of the present invention may be directed to relatively low/reduced complexity architectures for DFTS-OFDM transmitters that eliminate/reduce use of fast Fourier transforms and/or inverse fast Fourier transforms. Transmitters according to some embodiments of the present invention may generate transmit signals that are substantially equivalent to transmit signals generated by DFTS-OFDM transmitter 50 (including FFT followed by zero padding and IFFT). Transmitters according to some embodiments of the present invention may be useful when a bandwidth of the transmitted signal is relatively small compared with overall system bandwidth, as may be the case for relatively low/reduced power and/or low/reduced data-rate wireless communication devices.

Note that, although 3GPP LTE uplinks may be discussed according to some embodiments of the present invention, embodiments of the present invention are not limited to 3GPP LTE systems. Accordingly, embodiments of the present invention may be implemented in any system using DFTS-OFDM.

According to some embodiments of the present invention, a DFTS-OFDM transmitter may be implemented without FFT and IFFT blocks/operations which may otherwise be relatively complex and/or computationally intensive. Transmitters according to some embodiments of the present invention, for example, may generate substantially equivalent transmit signals using sampling rate conversion implemented in digital front-ends of multi-mode multi-band radio transmitters.

According to embodiments of FIG. 4, transmitter 400 may include up sampler 401, digital filter 403, down sampler 405, and digital mixer 459. Up sampler 401 may pad (P−1) zeros at every modulation symbol of a serial stream of modulation symbols provided as an input thereto (e.g., based on data/symbols provided by processor 201) to generate samples of transmission symbols. Digital filter 403 may effectively filter out replica symbols except desired symbols (e.g., digital filter 403 may filter out a total of P−1 replica symbols) to generate filtered samples of the transmission symbols. Either a circular or a linear convolution may be used to provide the digital filtering operation of digital filter 403. Down sampler 405 may then take one sample out of every $Q^{th}$ sample from an output of digital filter 403 to generate sampling rate converted symbols, where N is a total number of subcarriers of the communications system (e.g., RAN 60), where M is the number of subcarriers assigned to transmitter 100a (such that M<N), where N/M=P/Q, and where P and Q are co-prime integers. Since the sample rate conversion may place the spectrum around DC, digital mixer 459 may be used to move/shift the spectrum of the output of down sampler 405 to the assigned user bandwidth. Accordingly, up sampler 401, digital filter 403, and down sampler 405 may together make up a sampling rate converter according to some embodiments of the present invention.

Digital mixer 459 may be placed after the down sampler 405 as shown in FIG. 4, and a mixing frequency (defined by the mixing sequence) may be given by a center frequency of spectrum. According to other embodiments, digital mixing may be performed before up sampling. The mixing frequency may also include an offset of half the subcarrier spacing that may be needed to center the spectrum around DC, for example, in the event that the center frequency is DC and the number of subcarriers is an even number. If digital mixer 459 is placed after down sampler 405 as shown in FIG. 4, digital filter 403 may pass the replica symbols around DC (i.e., to provide low-pass filtering). On the other hand, if digital mixing is performed before up sampling, digital filter 403 may pass the replicas around the center frequency (i.e., to provide band-pass filtering).

Sampling rate conversion techniques, such as polyphase implementation conversion techniques discussed by P. P. Vaidyanathan in "Multirate Systems And Filter Banks" (Prentice Hall, New Jersey, pp. 127-130) and/or Farrow interpolation conversion techniques as discussed by H. Meyr et al. in "Digital Communication Receivers" (John Wiley & Sons, New York, pp. 505-523), may be applied to transmitter 400 of FIG. 4, especially, if M and N are incommensurate. The disclosures of both of the above cited references are hereby incorporated herein in their entireties by reference. Sampling rate conversion may thus be performed using a polyphase structure of a corresponding fractional decimation/interpolation and/or using a Farrow structure of a corresponding polynomial interpolation.

When linear convolution is used by digital filter 403, a transmission signal output of transmitter 400 (i.e., an output of digital mixer 459) may be an approximation of an output of DFTS-OFDM transmitter 50 implemented using FFT and IFFT. When linear convolution is used, a partial-response low-pass filter may be used to suppress/reduce interference to adjacent channels due to imperfect low-pass filtering. A 3-dB bandwidth of a partial response filter (e.g., a linearized GMSK or Gaussian Minimum Shift Keying filter) may be reduced to less than the baud rate, which may provide significant adjacent subcarrier suppression at the expense of some inter-symbol interference (ISI). Any resulting ISI may reduce an effective cyclic-prefix length (i.e., an allowable delay spread covered by the given cyclic prefix) but may be transparent to the base station receiver. Digital filter 403 characteristics may be determined off-line based on such parameters as M, N and a designated baud rate. Accordingly, a bandwidth reduction achieved by partial response filtering may be balanced between adjacent-channel interference and loss in effective cyclic-prefix length.

As discussed above, FIG. 3 illustrates a DFTS-OFDM transmitter 50 that uses FFT and IFFT operations/blocks. Note that a spectrum mask of the transmit signal may be controlled by the frequency-domain operation (e.g., using subcarrier mapping and zero padding between FFT and IFFT operations/blocks). In general, a transmitter may use a fraction of the cell bandwidth so that M is smaller than N. Therefore, the transmit sequence (e.g., an output of IFFT 55 in FIG. 3) may be considered as a resampled version of the original sequence (e.g., an input of FFT 53 input in FIG. 3). An underlying resampling process may also be referred to as sampling rate conversion with the conversion factor being N/M. The digital mixer of FIG. 3 may be used when a spectrum of IFFT 55 output needs to be offset by half the subcarrier spacing (i.e., when the center frequency is DC and the number of subcarriers is an even number). Although resource mapping may be assumed to be localized in the following example (i.e., the M subcarriers are all contiguous) embodiments of the present invention may also be applicable to different resource mapping methods (e.g., clustered resource mapping and/or distributed resource mapping).

According to some embodiments, $W_M$ may be a precoding matrix of size M×M for FFT 53 used by DFTS-OFDM transmitter 50, and $N^{-1}W_N^H$ may be a corresponding N-point matrix of size N×N for IFFT 55 used by DFTS-OFDM transmitter 50. Accordingly, the matrix $W_M$ may thus define a fast Fourier transform operation of M-point FFT 53, the matrix $N^{-1}W_N^H$ may define an inverse fast Fourier transform operation of N-Point IFFT 55, s may be a vector of M QAM (Quadrature Amplitude Modulation) symbols generated by S/P converter 51, and x may be the output of IFFT 55. The combination of FFT precoding, subcarrier mapping with zero padding, and IFFT transformation of the vector s=(s[0], s[1], . . . , s[M−1])$^T$ of M QAM symbols may be expressed as:

$$x = \begin{bmatrix} x[0] \\ x[1] \\ \vdots \\ x[N-1] \end{bmatrix} = \underbrace{\frac{1}{N} W_N^H J_{i_0,M}^H W_M s = D_{i_0}\left(\frac{1}{N} W_N^H J_{i_0,M}^H\right) W_M s}_{F} = D_{i_0} F s \quad \text{Eq. (1)}$$

where x denotes an output of IFFT 55, and $i_0 \in \{0,1,2\ldots,N-1\}$ denotes a first subcarrier index occupied by the transmitted signal. Moreover, $J_{i_0,M} = [0_{M \times i_0}, I_M, 0_{M \times (N-i_0-M)}]$ denotes a matrix formed by concatenating $i_0$ columns of zeros, an M×M identity matrix, and (N−$i_0$−M) columns of zeros, and $D_{i_0}$ denotes a diagonal matrix with $\exp\{j2\pi i_0 n/N\}$ as the (n+1)$^{th}$ diagonal elements, for $n \in \{0,1,2, \ldots, N-1\}$. Let K be the lowest common multiple of N and M, and let K=QN and K=PM for some coprime integers P and Q. Note that when N and M are co-prime, then P=N and Q=M. Also when N is a multiple of M, then Q=1 and P=N/M.

Equation (1) thus transforms a vector s of QAM symbols (also referred to as a symbol vector) into a transmitter output x. More particularly, the symbol vector s is multiplied by a predetermined composite transformation matrix F. Elements of the resulting vector Fs are then rotated according to the assigned subcarriers (as indicated by the first subcarrier index) to form the frequency-domain transmit vector x, where the rotation may be accomplished by multiplying the vector Fs by the frequency translation matrix $D_{i_0}$, which is a diagonal matrix.

The element of the composite transformation matrix F (excluding the frequency translation matrix $D_{i_0}$) at the $(n+1)^{th}$ row and $(m+1)^{th}$ column may thus be given by:

$$[F]_{n,m} = \frac{1}{N}\sum_{k=0}^{M-1} \exp\left\{j\frac{2\pi nk}{N}\right\}\exp\left\{-j\frac{2\pi km}{M}\right\} \quad \text{Eq. (2)}$$

$$= \frac{1}{N}\sum_{k=0}^{M-1}\left(\exp\left\{j\frac{2\pi}{K}(nQ-mP)\right\}\right)^k$$

$$= \frac{1}{N}\frac{\exp\left\{j\frac{2\pi M}{K}(nQ-mP)\right\}-1}{\exp\left\{j\frac{2\pi}{K}(nQ-mP)\right\}-1}$$

$$= \frac{M}{N}\exp\left\{j\frac{\pi(M-1)}{K}(nQ-mP)\right\}\frac{\mathrm{sinc}\left(\frac{(nQ-mP)}{P}\right)}{\mathrm{sinc}\left(\frac{(nQ-mP)}{K}\right)}.$$

where $\mathrm{sinc}(x)=(\pi x)^{-1}\sin(\pi x)$. Let f[k] be the coefficients of a digital filter where f[k] is defined by:

$$f[k] \equiv \frac{M}{N}\exp\left\{j\frac{\pi(M-1)}{L}k\right\}\frac{\mathrm{sinc}\left(\frac{k}{P}\right)}{\mathrm{sinc}\left(\frac{k}{K}\right)} = \frac{1}{N}\frac{\exp\left\{j\frac{2\pi M}{K}k\right\}-1}{\exp\left\{j\frac{2\pi}{K}k\right\}-1} \quad \text{Eq. (3)}$$

for k=0,1, . . . , K−1. Note that f[k] is a periodic signal with period K, such that:

*f[k]=f[k+K] for all i.*

It follows from Equation (2) that the matrix F can therefore be derived from $\{f[k]\}_{k=0}^{K-1}$ as:

$$F = \begin{bmatrix} f[0] & f[-P\bmod K] & \ldots & f[-(M-1)P\bmod K] \\ f[Q] & f[Q-P\bmod K] & \ldots & f[Q-(M-1)P\bmod K] \\ \vdots & \vdots & \ddots & \vdots \\ f[(N-1)Q] & f[(N-1)Q\bmod K] & \ldots & f[(N-1)Q-(M-1)P\bmod K] \end{bmatrix} \quad \text{Eq. (4)}$$

Therefore, the output of a DFTS-OFDM transmitter can be directly computed by rotating the $(n+1)^{th}$ element of the vector Fs by $\exp\{j2\pi i_0 n/N\}$, where F is derived from predetermined coefficients $\{f[k]\}_{k=0}^{K-1}$.

Figure 5A:
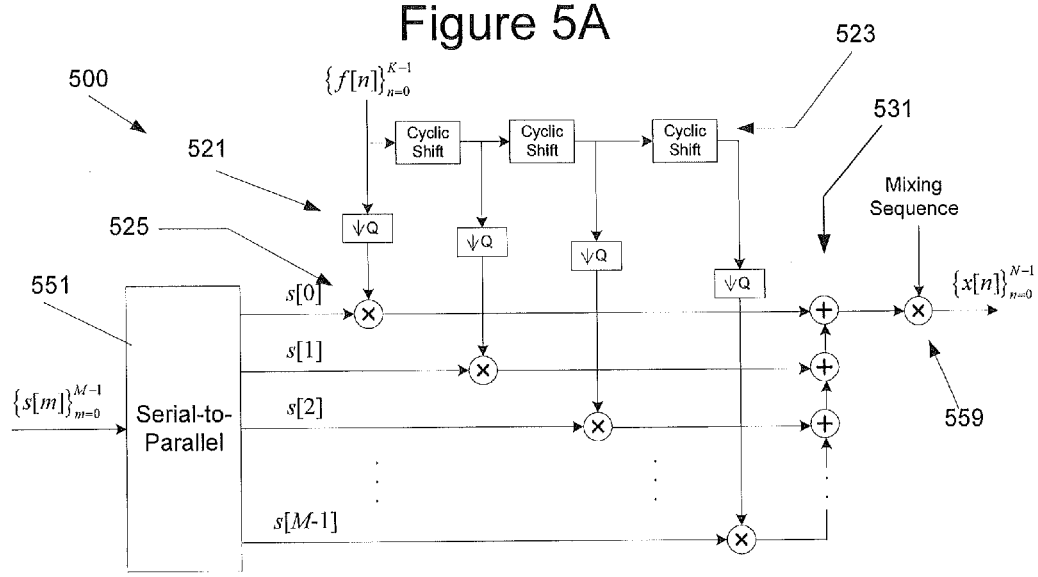
FIGS. 5A and 5B are block diagrams illustrating transmitter structures of FIG. 2 including vector combining/multiplication.

FIG. 5A illustrates transmitter structures/operations using such a vector-combining implementation according to some embodiments of the present invention. Serial-to-parallel converter 551 processes the serial stream of QAM symbols to generate M parallel QAM symbols, and columns of matrix F (obtained by circularly shifting the predetermined coefficients $\{f[k]\}_{k=0}^{K-1}$ using down samplers 521 and cyclical shift operations/blocks 523) are scaled (using multipliers 525) by the respective input QAM symbols (e.g., s[0], s[1], s[2], s[M−1]), and summed (using addition elements 531 providing a vector multiplication). The result is mixed with a mixing sequence (corresponding to $D_{i_0}$) using digital mixer 559 to yield the desired output signal x of DFTS-OFDM transmitter 500. Stated in other words, a result of vector multiplication (provided by addition elements 531) may be subjected to frequency shifting (using digital mixer 559 providing post-frequency shifting) to yield a desired output signal x of DFTS-OFDM transmitter 500. Note that complexity of transmitter 500 may scale with O(MN), as opposed to scaling with (O(N log N)+O(M log M)) or possibly even O($M^2N^2$) as may be the case with certain DFT-IFFT implementations. For relatively small numbers of symbols M, reductions of complexity may be significant. Accordingly, the block diagram of FIG. 5A illustrates an implementation of Equation (1) while exploiting a periodicity of the signal f[k] from which the elements of the composite transformation matrix F are drawn.

Figure 5B:
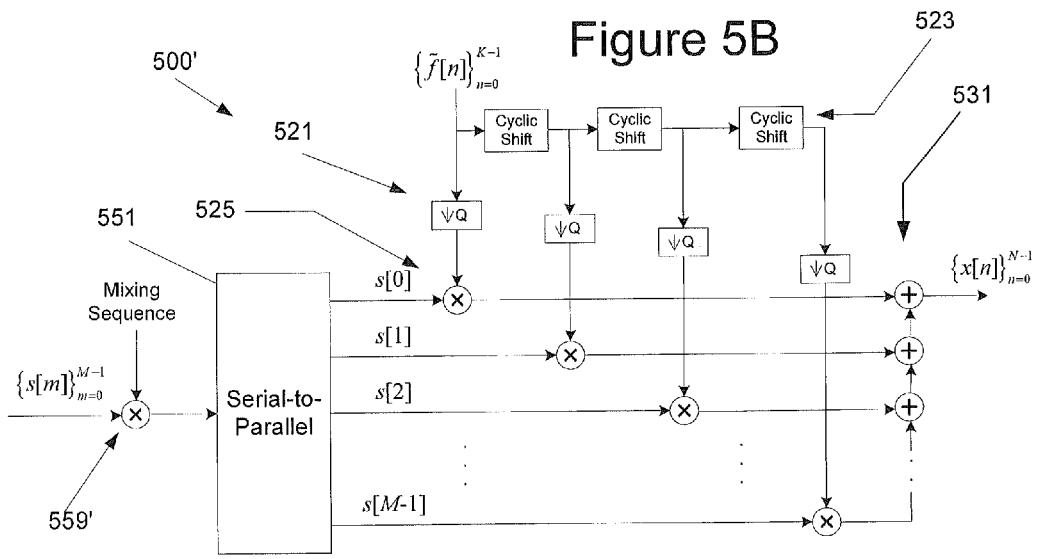

FIG. 5B illustrates alternative transmitter structures/operations with frequency shifting performed by digital mixer 559' prior to serial-to-parallel conversion. In this case, digital mixer 559' may apply frequency-shifting operations to the coefficients of the digital filter so that the new digital filter coefficients are given by:

$$\tilde{f}[k] = \exp\left\{\frac{2\pi i_0 k}{K}\right\}f[k]$$

for k=0,1, . . . , K−1. In effect, the structure of FIG. 5B may present an implementation of an alternative way of expressing Equation (1) as:

$$x = D_{i_0} Fs = \underbrace{(D_{i_0} F \tilde{D}_{i_0}^H)}_{\tilde{F}} \tilde{D}_{i_0} s \quad \text{Eq. (5)}$$

where:

$$\tilde{F} = \begin{bmatrix} \tilde{f}[0] & \tilde{f}[-P\bmod K] & \ldots & \tilde{f}[-(M-1)P\bmod K] \\ \tilde{f}[Q] & \tilde{f}[Q-P\bmod K] & \ldots & \tilde{f}[Q-(M-1)P\bmod K] \\ \vdots & \vdots & \ddots & \vdots \\ \tilde{f}[(N-1)Q] & \tilde{f}[(N-1)Q\bmod K] & \ldots & \tilde{f}[(N-1)Q-(M-1)P\bmod K] \end{bmatrix} \quad \text{Eq. (6)}$$

and $\tilde{D}_{i_0}$ denotes a diagonal matrix with $\exp\{2\pi i_0 m/M\}$ as the $(m+1)^{th}$ diagonal elements, for m∈{0, 1, 2, . . . ,M−1}. The matrix multiplication by $\tilde{D}_{i_0}$ may be essentially the same operation as the frequency-shifting or mixing operation depicted in FIG. 5B (except for the sampling rate). In Equation (5) an ordering of the frequency translation matrix $\tilde{D}_{i_0}$ and the composite transformation matrix $\tilde{F}$ may be switched relative to the ordering of Equation (1). Accordingly, the block diagram of FIG. 5B illustrates an implementation of Equation (1) while exploiting a periodicity of the signal f[k] from which elements of the composite transformation matrix F are drawn.

Operations of transmitters 500 and 500' may be summarized as follows. First, a period of K values f[k] of the digital filter may be extracted from memory for each block of parallel symbol vectors s[0] to s[M−1]. Second, cyclic shifts of these values f[k] (excepting the first value f[0]) may be performed by cyclical shift operations/blocks 523. Third, down samplers 521 may down sample the resulting f[k] values by a factor of Q to provide N values (i.e., one out of every Q values may be taken from the list of K values beginning with the first sample). Fourth, each sequence of N values may be multiplied by the respective symbol s[i] (the $i^{th}$ QAM symbol starting from i=0). Fifth, the resulting sequence of N values may be added into a buffer of N values (which are initialized to zeros). Sixth, i may be incremented, and the second through fifth operations may be repeated. Seventh, values in the buffer may be rotated according to a mixing sequence, and eighth, a buffer of N values may be sent to the output.

The coefficients $\{f[k]\}_{k=0}^{K-1}$ (i.e., the elements of F or $\tilde{F}$) may be calculated in advance for the given parameters M and N and stored in memory. When the DFTS-OFDM signal will be generated for multiple combinations of M and N (e.g., LTE UL), multiple sets of coefficients may be stored in memory and the coefficients may be looked up each time M and/or N change. In an alternative, a whole set of the coefficients (i.e., $F_0$ in Equation (7) below) may be stored, and F or $\tilde{F}$ may be computed on the fly for a given parameter M and/or N. This may lead to more efficient implementations of DFTS-OFDM transmitters in the sense that implementation of multiple DFT and FFT operations may not be required. Note that conventional DFTS-OFDM transmitters (i.e., DFTS-OFDM transmitters using DFT-FFT-based implementations) may impose some constraint on parameters M and/or N in LTE UL (uplinks). M, for example, may be confined to multiples of 2, 3 and 5, which may in turn lead to constraints to the eNB scheduler.

According to some embodiments of the present invention, the matrix F may be a sub-matrix obtained by taking every P columns and every Q rows of a K×K matrix given by:

$$F_0 = \begin{bmatrix} f[0] & f[K-1] & \cdots & f[1] \\ f[1] & f[0] & \cdots & f[2] \\ \vdots & \vdots & \ddots & \vdots \\ f[K-1] & f[K-2] & \cdots & f[0] \end{bmatrix}, \quad \text{Eq. (7)}$$

which is a circulant matrix due to the periodic nature of f[i]. Therefore, F can be expressed as:

$$F = QF_0P, \quad \text{Eq. (8)}$$

where P is a K×M matrix with respective elements given by $[P]_{k,m} = \delta[k-mP]$, and where Q is a N×K matrix with respective elements given by $[Q]_{n,k} = \delta[nQ-k]$. Noting that P and Q represent Px up sampling and Qx down sampling, respectively, Fs may be implemented using Px up sampling, circular convolution with filter coefficients f[k], and Qx down sampling. By letting $s_P[k]$ denote the up sampled version of s[m], $s_P[k]$ may be expressed as:

$$s_P[k] = \sum_m s[m] \times \delta[k - mP],$$

for $$k = 0, 1, \ldots, K-1$$

From Equations (7) and (8), it may follow that the output x[n] of the IFFT can be expressed as:

$$x[n] = \exp\left\{j\frac{2\pi i_0 n}{N}\right\}(f[k] \otimes s_P[k])\Big|_{k=nQ} \quad \text{Eq. (9)}$$

where ⊗ denotes circular convolution. As shown in equation (9), a combination of FFT precoding, subcarrier mapping with zero padding, and IFFT transformation may be implemented by Px up sampling of QAM symbols s[m], digital filtering with circular convolution with filter coefficients f[k], Qx down sampling, and frequency offsetting according to the first subcarrier index $i_0$. Frequency offsetting, for example, may be implemented using a digital mixer.

According to some embodiments, digital mixing may be performed before up sampling. Stated in other words, a digital mixer may be placed before an up sampler. Noting that a frequency offset of a circular convolution output may be equivalent to the circular convolution of the frequency offset input and the frequency offset coefficient, Equation (9) may be used to show that:

$$x[n] = \left\{\left(e^{j\frac{2\pi i_0 k}{K}}f[k]\right) \otimes \left(e^{j\frac{2\pi i_0 k}{K}}s_P[k]\right)\right\}\Big|_{k=nQ} \quad \text{(Eq. 10)}$$

Stated in other words, a DFTS-OFDM transmitter may be implemented using Px up sampling of QAM symbols s[m], frequency offsetting of the up sampled QAM symbols, digital filtering with circular convolution with rotated filter coefficients exp{j2π$i_0$k/K} f[k], and Qx down sampling.

FIGS. 4 and 6 show transmitters 400 and 600 according to embodiments of the present invention including sampling rate conversion and digital mixing. As shown, transmitters 400 and 600 include respective up samplers 401/601, digital filters 403/603, down samplers 405/605, and digital mixers 459/659. The up samplers 401/601 pad (P−1) zeros at every modulation symbol to generate samples of transmission symbols, while down samplers 405/605 take one sample out of every Q samples at respective filter outputs 403/603 to generate sampling rate converted symbols.

In FIG. 4, digital mixer 459 is placed after down sampler 405. Digital filter 403 (e.g., a low-pass filter) may filter out all replicas except the replica around DC. Stated in other words, for each symbol, (P−1) high-frequency replicas may be significantly/totally filtered out using filter 403 to generate filtered samples of the transmission symbols. Accordingly, a bandwidth of filter 403 may be programmable according to N and M according to Equation (3). An output of down sampler 401 may have a spectrum centered around DC (except half the subcarrier spacing offset), and therefore, digital mixer 459 may translate the spectrum to a bandwidth assigned to wireless terminal 200. Digital mixer 459 may be implemented to provide multiplication with the mixing sequence, and the mixing sequence may be efficiently generated, for example, using an NCO (Numerically Controlled Oscillator). The resulting mixing frequency may be determined by the center frequency of the assigned bandwidth, and the mixing frequency can include an offset of half the subcarrier spacing mentioned above.

According to embodiments shown in FIG. 6, digital mixer 659 may be placed before up sampler 601, and digital mixer 659 may translate the spectrum to the assigned bandwidth. This translation may be implemented using techniques discussed above with respect to FIG. 4, with a clock frequency of the digital mixer (its multiplier) that is lower by a factor of M/N. Digital filter 603 (e.g., a band-pass filter) may then filter out all replicas except the one around the center frequency to generate filtered symbols of the transmission symbols. Stated in other words, for each symbol, (P−1) off-the-carrier replicas may be significantly/totally filtered out using filter 603. A bandwidth of filter 603 may thus be the same as that of low-pass filter 403 of FIG. 4, and the bandwidth and center frequency of filter 603 may also be programmable according to N and M. Accordingly, up sampler 601, digital filter 603, and down sampler 605 may together make up a sampling rate converter according to some embodiments of the present invention.

The up sampling and down sampling factors (P and Q) may be scaled up by any integer. This up scaling, however, may increase a clock frequency of the transmitter and may thus increase complexity of digital filtering implemented by filter 603. Existing sampling rate conversion techniques may be applicable to transmitters according to some embodiments of the present invention. For example, algorithms using polyphase implementation conversion techniques and/or Farrow interpolation conversion techniques may be used, especially, if M and N are extremely/relatively large and/or incommensurate. Sampling rate conversion may thus be performed using a polyphase structure of a corresponding fractional decimation/interpolation and/or using a Farrow structure of a corresponding polynomial interpolation. Each of these sampling rate conversion techniques may reduce clock frequency and/or reduce a hardware area of transmitter 400 and/or 600.

FIG. 7A is a block diagram illustrating a polyphase implementation 400' of transmitter 400 with circular convolutions 725 where a block of M symbols s are converted into a desired DFTS-OFDM transmission signal x by computing a sum (using adders 731) of multiple cyclic-shifted versions of digital filter 403, each scaled by one of the M input symbols s. More particularly, symbols s[n] may be up sampled using up sampler 401, and subjected to time shifting using time shift blocks 719 and down sampling using down samplers 721*b*. Columns of matrix F (obtained by shifting the predetermined coefficients using down samplers 721*a* and cyclical shift operations/blocks 723) are scaled (using circular convolutions 725) by the respective time shifted and down sampled symbols (e.g, $s_P[Qn]$ to $s_P[Qn+Q-1]$), summed (using adders 731), and mixed with a mixing sequence (corresponding to $D_{i_0}$) using digital mixer 459 to yield the desired output signal x[n] of DFTS-OFDM transmitter 500. These operations can be illustrated using the derivation of x[n] as follows:

$$x[n] = \exp\left\{j\frac{2\pi i_0 n}{N}\right\}(f[k] \otimes s_P[k])\Big|_{k=nQ}$$

$$= \exp\left\{j\frac{2\pi i_0 n}{N}\right\}\left(\sum_m s_P[m]f[(nQ - m) \bmod K]\right)$$

$$= \exp\left\{j\frac{2\pi i_0 n}{N}\right\}\left(\sum_{i=0}^{Q-1} \sum_{m:m=i \bmod Q} s_P[m]f[(nQ - m) \bmod K]\right)$$

$$= \exp\left\{j\frac{2\pi i_0 n}{N}\right\}\left(\sum_{i=0}^{Q-1} \sum_l s_P[lQ + i]f[((n - l)Q - i) \bmod K]\right).$$

Similar derivations can be obtained using module operations from the argument of $s_P[n]$. Accordingly, the cyclic shifts in FIG. 7A may also/alternatively be implemented on the up sampled version of QAM symbols $s_P[n]$ (i.e., by swapping "cyclic shifts" and "time shifts" in FIG. 7A).

FIG. 7A corresponds to embodiments of FIG. 4, where frequency-shifting and/or mixing operations are performed after digital filtering. Alternatively, frequency-shifting and/or mixing operations may be performed before digital filtering as illustrated in transmitter 600' FIG. 7B, which corresponds to embodiments of FIG. 6. In FIG. 7B, symbols s[n] may be subject to frequency shifting using digital mixer 659 and then up sampled using up sampler 601. The up sampled symbols $s_P[n]$ may then be subjected to time shifting using time shift blocks 719 and down sampling using down samplers 721*b*. Columns of matrix F (obtained by shifting the predetermined coefficients using down samplers 721*a* and cyclical shift operations/blocks 723) are scaled (using circular convolutions 725) by the respective time shifted and down sampled symbols (e.g, $s_p[Qn]$ to $s_p[Qn+Q-1]$), summed (using adders 731) to yield the desired output signal x[n] of DFTS-OFDM transmitter 600'.

Circular convolutions 725 of FIGS. 7A and/or 7B may be replaced by linear convolutions according to embodiments illustrated in FIGS. 8A and 8B. According to some embodiments of FIG. 8A, digital filtering techniques (e.g., programmable filter techniques) may be more easily implemented.

With the DFTS-OFDM transmitter 400" of FIG. 8A that is used with linear convolution, fine spectrum control at specific (regularly-spaced) frequencies may be reduced relative to an FFT-IFFT based transmitter as illustrated, for example, in FIG. 3. Accordingly, an output of the transmitter 400" may be an approximation of an output of DFTS-OFDM transmitter 50 of FIG. 3, because there is no frequency domain operation in DFTS-OFDM transmitter 400", and instead, every operation may be performed in time domain. Some adjacent-channel interference may result due to spectrum leakage, which may be due to a failure of the low-pass filter used to completely filter out the high-frequency replicas. Note that it may not be possible to implement an ideal low-pass filter (i.e., a brick-wall filter).

To reduce adjacent channel interference due to imperfect low-pass filtering, leakage to a few adjacent subcarriers at both ends of the spectrum may need to be suppressed/reduced. This suppression/reduction may be provided using a partial response digital filter (e.g., a linearized GMSK or Gaussian Minimum Shift Keying filter used in GSM/EDGE systems) with a 3 dB bandwidth that is less than the baud rate (e.g., a number of symbols transmitted per second). Use of such a partial response digital filter may make the spectrum of the transmit signal more compact at the expense of self-inflicted inter-symbol interference (ISI). The resulting ISI may reduce an effective cyclic-prefix length (i.e., an allowable delay spread covered by the given cyclic prefix), but the resulting ISI may be transparent to the receiver. The filter may be determined offline based on such parameters as M, N and the given baud rate. Therefore, bandwidth reduction achieved using partial response filtering may be balanced (with no need for real-time operation) between adjacent-channel interference and loss in effective cyclic-prefix length.

Existing sampling rate conversion techniques may be applicable to transmitters according to some embodiments of the present invention, such as, state-of-the-art hardware-efficient algorithms including polyphase implementation and/or Farrow interpolation, especially if M and N are extremely/relatively large and/or incommensurate.

Polyphase implementation and/or Farrow interpolation may help reduce a clock frequency and/or a hardware area of transmitter 400". FIG. 8A, for example, is a block diagram illustrating a polyphase implementation 400" of transmitter 400 with linear convolutions 825 where a sequence of QAM symbols are converted into a desired DFTS-OFDM signal by computing a sum (using adders 831) of multiple digitally filtered signals at a reduced sampling rate. More particularly, symbols s[n] may be up sampled using up sampler 401, and subjected to time shifting using time shift blocks 819 and down sampling using down samplers 821*b*. Columns of matrix F (obtained by shifting the predetermined coefficients using down samplers 821*a* and time shift operations/blocks 823) are scaled (using linear convolutions 825) by the respective time shifted and down sampled symbols (e.g, $s_P[Qn]$ to $s_P[Qn+Q-1]$), summed (using adders 831), and mixed with a mixing sequence (corresponding to $D_{i_0}$) using mixer 459 to yield the desired output signal x[n] of DFTS-OFDM transmitter 500. These operations can be illustrated the following derivation of x[n] (where * denotes the linear convolution):

$$x[n] = \exp\left(j\frac{2\pi i_0 n}{N}\right)(f[k]*s_P[k])\Big|_{k=nQ}$$

$$= \exp\left(j\frac{2\pi i_0 n}{N}\right)\left(\sum_m s_P[m]f[nQ-m]\right)$$

$$= \exp\left(j\frac{2\pi i_0 n}{N}\right)\left(\sum_{i=0}^{Q-1}\sum_{m:m=i\bmod Q} s_P[m]f[nQ-m]\right)$$

$$= \exp\left(j\frac{2\pi i_0 n}{N}\right)\left(\sum_{i=0}^{Q-1}\sum_l s_P[lQ+i]f[(n-l)Q-i]\right).$$

Compared to a DFTS-OFDM transmitter 50 including FFT and IFFT blocks/operations as shown in FIG. 3, some embodiments of the present invention may enable reduced complexity relative to DFTS-OFDM transmitter 50 (e.g., reducing cost and/or power consumption of the transmitter). A reduction in complexity may be significant, especially when wireless terminal bandwidth (M) occupies a relatively small fraction of cell bandwidth (N) (also referred to as base station bandwidth and/or radio access network bandwidth). Embodiments of FIGS. 7A and 7B (using circular convolutions 725) may generate substantially/exactly the same transmitted signal as DFTS-OFDM transmitter 50. FFT and IFFT operations/blocks 53 and 55 of FIG. 3 may be replaced by matrix-vector multiplication in embodiments of FIGS. 7A, 7B, 8A, and/or 8B, which may reduce complexity, if the wireless terminal bandwidth is narrower than the cell bandwidth (e.g., base station and/or RAN bandwidth).

Transmitter 400" of FIG. 8A corresponds to embodiments of FIG. 4 where frequency-shifting and/or mixing operations may be performed after digital filtering. Alternatively, frequency-shifting and/or mixing operations may be performed before digital filtering as illustrated by transmitter 600" of FIG. 8B, which corresponds to embodiments of FIG. 6. More particularly, symbols s[n] may be frequency shifted using digital mixer 659 and then up sampled using up sampler 601. The up sampled symbols $s_P[n]$ may then be subjected to time shifting using time shift blocks 819 and down sampling using down samplers 821b. Columns of matrix F (obtained by shifting the predetermined coefficients using down samplers 821a and time shift operations/blocks 823) are scaled (using linear convolutions 825) by the respective time shifted and down sampled symbols (e.g, $s_P[Qn]$ to $s_P[Qn+Q-1]$), and summed (using adders 831) to yield the desired output signal x[n] of DFTS-OFDM transmitter 500.

Using circular convolutions, transmitter 400' according to embodiments of FIG. 7A may provide that transmitter 400 of FIG. 4 may be decomposed into up sampling, digital filtering, down sampling, and digital mixing. By moving the digital mixer from the down sampling output to the up sampling input and rotating the filter coefficients by the frequency offset according to embodiments of FIGS. 6 and 7B, a clock frequency of the digital mixer may be reduced, thereby reducing power consumption (e.g., N/M).

Embodiments of FIGS. 8A and/or 8B using linear convolutions may more easily exploit existing techniques for programmable filter design and/or sampling rate conversion. Issues relating to spectrum leakage may be reduced/alleviated using a low-pass filter with relatively narrower bandwidth to reduce/suppress a predetermined number of subcarriers around both spectrum ends.

Noting that sampling rate conversion techniques may also be characterized by a cascade of up sampling, digital filtering (e.g., convolution) and down sampling, techniques such as polyphase implementation (e.g., using a polyphase structure of a corresponding fractional decimation/interpolation) and/or Farrow interpolation (e.g., using a Farrow structure of a corresponding polynomial interpolation) may be readily applicable to embodiments of FIGS. 7A/7B and/or FIGS. 8A/8B.

Embodiments described herein may be beneficial for use in relatively inexpensive and/or low/reduced data rate radio devices of the type that are becoming increasingly common in telecommunication networks. For example, embodiments of FIGS. 4, 5A, 5B 6, 7A, 7B, 8A, and/or 8B may reduce costs of radio-enabled sensors, meters, identification tags, and/or other wireless devices with relatively low/reduced rate data transmission needs. Some embodiments of the present invention may reduce and/or eliminate a need for FFT-related hardware for transmission and, if used in a receiving direction as well, may permit FFT-related hardware to be omitted altogether.

According to embodiments of FIG. 9, wireless terminal processor 201 and/or transmitter 209a may be configured to provide a serial stream of modulation symbols. At block 901, transmitter 209a may be configured to generate samples of transmission symbols from a serial stream of modulation symbols, and at block 905, transmitter 209a may be configured to filter the samples of the transmission symbols in a time domain to generate filtered samples of the transmission symbols. Transmitter 209a may then down sample the filtered samples of the transmission symbols to generate sampling rate converted symbols (e.g., down sampled versions of the transmission symbols) at block 907. At block 909, transmitter 209a may digitally mix the sampling rate converted symbols with a mixing sequence, and transmitter 209a may then transmit the sampling rate converted symbols over a wireless channel to a node 100 of the radio access network 60 at block 911.

Filtering the samples of the transmission symbols at block 905 may include digitally filtering the samples of the transmission symbols using time varying coefficients. Moreover, filtering the samples of the transmission symbols at block 905 may include low pass filtering the samples of the transmission symbols. In addition, digitally mixing the sampling rate converted symbols with the mixing sequence at block 909 may include moving a spectrum of the down sampled versions of the transmission symbols to a bandwidth assigned to the wireless terminal 200.

Generating the samples of transmission symbols at block 901 may include up sampling the serial stream of modulation symbols.

Filtering at block 905 may include filtering out replica symbols from the samples of transmission symbols. Moreover, filtering the samples of the transmission symbols in the time domain at block 905 may include filtering the samples of the transmission symbols using circular convolution. In an alternative, filtering the samples of the transmission symbols in the time domain at block 905 may include filtering the samples of the transmission symbols using linear convolution, for example, using a partial-response low-pass filter.

Operations of FIG. 9, for example, may be applied with respect to transmitter structures discussed above with respect to FIGS. 4, 7A, and/or 8A.

According to embodiments of FIG. 10, wireless terminal processor 201 and/or transmitter 209a may be configured to provide a serial stream of modulation symbols. At block 1000, transmitter 209a may digitally mix the serial stream of modulation symbols with a mixing sequence. At block 1001, transmitter 209a may generate samples of transmission symbols from the modulation symbols, and at block 1005, transmitter 209a may filter the samples of the transmission symbols in a time domain to generate filtered samples of the transmission symbols. At block 1007, transmitter 209a may down sample the filtered samples of the transmission symbols to generate sampling rate converted symbols. At block 1011, transmitter 209a may transmit the sampling rate converted symbols over a wireless channel to a node 100 of radio access network 60.

Filtering the samples of the transmission symbols at block 1005 may include filtering the samples of the transmission symbols using time varying coefficients, for example, using band pass filtering. Generating the samples of transmission symbols at block 1001 may include up sampling the serial stream of modulation symbols. Filtering at block 1005 may include digitally filtering out replica symbols from the samples of transmission symbols. Filtering the samples of the transmission symbols in the time domain at block 1005 may include filtering the samples of the transmission symbols using circular convolution. In an alternative, filtering the samples of the transmission symbols in the time domain at block 1005 may include filtering the samples of the transmission symbols using linear convolution, for example, using a partial-response low-pass filter.

Operations of FIG. 10, for example, may be applied with respect to transmitter structures discussed above with respect to FIGS. 6, 7B, and/or 8B.

According to some embodiments of FIG. 11, wireless terminal processor 201 and/or transmitter 209a may be configured to provide a serial stream of modulation symbols. At block 1101, transmitter 209a may perform sampling rate conversion in a time domain on the serial stream of modulation symbols to generate sampling rate converted symbols. Transmitter 209a may then transmit the sampling rate converted symbols over a wireless channel to a node 100 of the radio access network 60 at block 1111.

Performing sampling rate conversion of block 1101, for example, may include operations of blocks 901 to 909 discussed above with respect to FIG. 9, and/or operations of blocks 1000 to 1007 discussed above with respect to FIG. 10. If sampling rate conversion of block 1101 is performed in accordance with blocks 901 to 907 of FIG. 9, for example, digital mixing operations of block 909 may be performed on the sampling rate converted symbols before transmitting at block 1111. If sampling rate conversion of block 1101 is performed in accordance with blocks 1001 to 1007 of FIG. 10, for example, digital mixing operations of block 1000 may be performed on the serial stream of modulation symbols before performing sampling rate conversion at block 1101.

According to some other embodiments, performing sampling rate conversion of block 1101 may include operations of blocks 1203 to 1209 discussed below with respect to FIG. 12, and/or operations of blocks 1301 to 1309 discussed below with respect to FIG. 13. If sampling rate conversion of block 1101 is performed in accordance with blocks 1203 to 1209 of FIG. 12, for example, digital mixing operations of block 1211 may be performed on the sampling rate converted symbols before transmitting at block 1111/1215. If sampling rate conversion of block 1101 is performed in accordance with blocks 1303 to 1309 of FIG. 13, digital mixing operations of block 1301 may be performed on the serial stream of modulation symbols before performing sampling rate conversion at block 1101.

According to some embodiments of FIG. 12, wireless terminal processor 201 and/or transmitter 209a may be configured to provide a serial stream of modulation symbols. At block 1203, samples of transmission symbols may be generated from a serial stream of modulation symbols. The samples may be generated, for example, using serial to parallel converter 551 of FIG. 5A. At block 1205, blocks of coefficients f[n] may be generated using pre-calculated information, for example, stored in memory 218. At block 1207, each block of coefficients may be multiplied (e.g., using multipliers 525) by a respective one of the samples of transmission symbols to provide respective coefficient block products. At block 1209, the coefficient block products may be summed (e.g., using adders 531), for example into a buffer, and the summed coefficient block products (e.g., sampling rate converted symbols) may be digitally mixed (e.g., using digital mixer 559) with a mixing sequence at block 1211. The summed and mixed coefficient block products (from the buffer) may be transmitted over a wireless channel to a node 100 of the radio access network 60 at block 1215. Operations of FIG. 12, may be performed for example by transmitter 500 of FIG. 5A.

According to some embodiments of FIG. 13, wireless terminal processor 201 and/or transmitter 209a may be configured to provide a serial stream of modulation symbols. At block 1301, the serial stream of modulation symbols may be digitally mixed (e.g., using digital mixer 559') with a mixing sequence, and samples of transmission symbols may be generated from a serial stream of modulation symbols at block 1303. The samples may be generated, for example, using serial to parallel converter 551 of FIG. 5B. At block 1305, multiple blocks of coefficients f[n] may be generated using pre-calculated information, for example, stored in memory 218. At block 1307, each block of coefficients may be multiplied (e.g., using multipliers 525) by a respective one of the samples of transmission symbols to provide respective coefficient block products. At block 1309, the coefficient block products may be summed (e.g., using adders 531) to provide sampling rate converted symbols, for example into a buffer, and the summed coefficient block products (from the buffer) may be transmitted over a wireless channel to a node 100 of the radio access network 60 at block 1315.

In blocks 1205 and 1305 of FIGS. 12 and 13, generating multiple blocks of coefficients using pre-calculated information may include operations illustrated in FIG. 14. As block 1401, a block of coefficients f[n] may be retrieved from memory. At least portions of the block of coefficients may be cyclically shifted (e.g., using cyclic shift operations/blocks 523) to generate a plurality of cyclically shifted versions of the block of coefficients at block 1403. At block 1405, each of the cyclically shifted versions of the block of coefficients may be down sampled to provide multiple blocks of down sampled cyclically shifted versions of the block of coefficients.

In the above-description of various embodiments of the present invention, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of the invention. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention. Accordingly, the above disclosed subject matter is to be considered illustrative, and not restrictive, and the appended claims are intended to cover all such modifications, enhancements, and other embodiments, which fall within the spirit and scope of the present invention. Thus, to the maximum extent allowed by law, the scope of the present invention is to be determined by the broadest permissible interpretation of the following claims and their equivalents, and shall not be restricted or limited by the foregoing detailed description. Any reference numbers in the claims are provided only to identify examples of elements and/or operations from embodiments of the figures/specification without limiting the claims to any particular elements, operations, and/or embodiments of any such reference numbers.

What is claimed is:

1. A method of transmitting data from a wireless terminal operating in a radio access network, the method comprising:
   performing sampling rate conversion on a serial stream of modulation symbols to generate sampling rate converted symbols; and
   transmitting the sampling rate converted symbols over a wireless channel to a node of the radio access network,
   wherein performing sampling rate conversion comprises,
     generating samples of transmission symbols from a serial stream of modulation symbols,
     filtering the samples of the transmission symbols using convolution in a time domain to generate filtered samples of the transmission symbols, and
     down sampling the filtered samples of the transmission symbols to generate the sampling rate converted symbols.

2. The method of claim 1 wherein performing sampling rate conversion comprises determining corresponding rate conversion based on cell bandwidth and based on user bandwidth assigned to the wireless terminal.

3. The method of claim 2 further comprising:
   before transmitting the sampling rate converted symbols and after performing sampling rate conversion, digitally mixing the sampling rate converted symbols with a mixing sequence.

4. The method of claim 3 wherein digitally mixing the sample rate converted symbols comprises determining the mixing sequence based on a frequency location of user bandwidth assigned to the wireless terminal.

5. The method according to claim 4 wherein performing sampling rate conversion comprises using a polyphase structure of a corresponding fractional decimation/interpolation.

6. The method according to claim 4 wherein performing sampling rate conversion comprises using a Farrow structure of a corresponding polynomial interpolation.

7. The method according to claim 2 further comprising:
before performing sampling rate conversion, digitally mixing the serial stream of modulation symbols with a mixing sequence.

8. The method of claim 1 further comprising:
before transmitting sampling rate converted symbols and after down sampling the filtered samples of the transmission symbols, digitally mixing the down sampled versions of the transmission symbols with a mixing sequence.

9. The method of claim 8 wherein filtering the samples of the transmission symbols comprises low pass filtering the samples of the transmission symbols.

10. The method of claim 8 wherein digitally mixing the down sampled versions of the transmission symbol with the mixing sequence comprises moving a spectrum of the down sampled versions of the transmission symbols to a bandwidth assigned to the wireless terminal.

11. The method of claim 1 further comprising:
before generating the samples of the transmission symbols, digitally mixing the serial stream of modulation symbols with a mixing sequence.

12. The method of claim 11 wherein filtering the samples of the transmission symbols comprises band pass filtering the samples of the transmission symbols.

13. The method of claim 1 wherein generating the samples of transmission symbols comprises up sampling the serial stream of modulation symbols.

14. The method of claim 1 wherein filtering the samples of the transmission symbols in the time domain comprises filtering the samples of the transmission symbols using circular convolution.

15. The method of claim 1 wherein filtering the samples of the transmission symbols in the time domain comprises filtering the samples of the transmission symbols using linear convolution.

16. The method of claim 15 wherein filtering the samples of the transmission symbols using linear convolution comprises filtering the samples of the transmission symbols using a partial-response low-pass filter.

17. The method of claim 1 wherein filtering comprises filtering the samples of the transmission symbols using circular or linear convolution.

18. The method of claim 1 wherein the modulation symbols comprises quadrature amplitude modulation (QAM) symbols.

19. A method of transmitting data from a wireless terminal operating in a radio access network, the method comprising:
performing sampling rate conversion on a serial stream of modulation symbols to generate sampling rate converted symbols; and
transmitting the sampling rate converted symbols over a wireless channel to a node of the radio access network,
wherein performing sampling rate conversion comprises,
generating samples of transmission symbols from a serial stream of modulation symbols,
generating multiple blocks of coefficients using pre-calculated information;
multiplying each block of coefficients by a respective one of the samples of transmission symbols to provide respective coefficient block products, and
summing the coefficient block products to generate the sampling rate converted symbols, and
wherein generating multiple blocks of coefficients using pre-calculated information comprises,
retrieving a block of coefficients from memory,
cyclically shifting at least portions of the block of coefficients to generate a plurality of cyclically shifted versions of the block of coefficients, and
down sampling each of the cyclically shifted versions of the block of coefficients to provide multiple blocks of down sampled cyclically shifted versions of the block of coefficients.

20. The method of claim 19 further comprising:
before generating the samples of the transmission symbols, digitally mixing the serial stream of modulation symbols with a mixing sequence.

21. The method of claim 19 wherein the modulation symbols comprises quadrature amplitude modulation (QAM) symbols.

22. A wireless terminal for communication in a radio access network, the wireless terminal comprising:
a processor configured to perform sampling rate conversion on a serial stream of modulation symbols to generate sampling rate converted symbols; and
a transmitter configured to transmit the sampling rate converted symbols over a wireless channel to a node of the radio access network,
wherein the processor is configured to perform sampling rate conversion on the serial stream of modulation symbols by,
generating samples of transmission symbols from a serial stream of modulation symbols,
filtering the samples of the transmission symbols using convolution in a time domain to generate filtered samples of the transmission symbols, and
down sampling the filtered samples of the transmission symbols to generate the sampling rate converted symbols.

23. A method of transmitting data from a wireless terminal operating in a radio access network, the method comprising:
performing sampling rate conversion on a serial stream of modulation symbols to generate sampling rate converted symbols, wherein performing sampling rate conversion comprises,
generating samples of transmission symbols from a serial stream of modulation symbols,
generating multiple blocks of coefficients using pre-calculated information;
multiplying each block of coefficients by a respective one of the samples of transmission symbols to provide respective coefficient block products, and
summing the coefficient block products to generate the sampling rate converted symbols;
after summing the coefficient block products, digitally mixing the sampling rate converted symbols with a mixing sequence; and
after digitally mixing the sampling rate converted symbols, transmitting the sampling rate converted symbols over a wireless channel to a node of the radio access network.

24. The method of claim 23 wherein the modulation symbols comprises quadrature amplitude modulation (QAM) symbols.

25. A wireless terminal for communication in a radio access network, the wireless terminal comprising:
a processor configured to:
generate samples of transmission symbols from a serial stream of modulation symbols;
generate multiple blocks of coefficients using pre-calculated information;

multiply each block of coefficients by a respective one of the samples of transmission symbols to provide respective coefficient block products; and sum the coefficient block products; and a transmitter configured to transmit the summed coefficient block products over a wireless channel to a node of the radio access network, wherein the processor is configured to generate multiple blocks of coefficients using pre-calculated information by, retrieving a block of coefficients from memory, cyclically shifting at least portions of the block of coefficients to generate a plurality of cyclically shifted versions of the block of coefficients, and down sampling each of the cyclically shifted versions of the block of coefficients to provide multiple blocks of down sampled cyclically shifted versions of the block of coefficients.

26. The method of claim 22 wherein the modulation symbols comprises quadrature amplitude modulation (QAM) symbols.

\* \* \* \* \*

UNITED STATES PATENT AND TRADEMARK OFFICE
CERTIFICATE OF CORRECTION

PATENT NO. : 8,947,993 B2
APPLICATION NO. : 13/556818
DATED : February 3, 2015
INVENTOR(S) : Park et al.

It is certified that error appears in the above-identified patent and that said Letters Patent is hereby corrected as shown below:

In the Specification,

In Column 14, Line 42, delete "M, N" and insert -- M, N, --, therefor.

Signed and Sealed this
Eighth Day of September, 2015

Michelle K. Lee
*Director of the United States Patent and Trademark Office*